United States Patent
Kim et al.

(10) Patent No.: US 12,374,723 B2
(45) Date of Patent: Jul. 29, 2025

(54) METHOD FOR MANUFACTURING ELECTRODE ASSEMBLY, ELECTRODE ASSEMBLY MANUFACTURED THERETHROUGH, AND SECONDARY BATTERY

(71) Applicant: LG ENERGY SOLUTION, LTD., Seoul (KR)

(72) Inventors: Woong Ki Kim, Daejeon (KR); Sang Don Lee, Daejeon (KR); Min Seung Choi, Daejeon (KR); Sang Uk Yeo, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 855 days.

(21) Appl. No.: 17/610,940

(22) PCT Filed: May 13, 2020

(86) PCT No.: PCT/KR2020/006307
§ 371 (c)(1),
(2) Date: Nov. 12, 2021

(87) PCT Pub. No.: WO2020/231186
PCT Pub. Date: Nov. 19, 2020

(65) Prior Publication Data
US 2022/0246991 A1    Aug. 4, 2022

(30) Foreign Application Priority Data
May 13, 2019    (KR) .................... 10-2019-0055813
May 13, 2020    (KR) .................... 10-2020-0056979

(51) Int. Cl.
*H01M 10/0585*    (2010.01)
*H01M 4/04*    (2006.01)
(Continued)

(52) U.S. Cl.
CPC ...... *H01M 10/0585* (2013.01); *H01M 4/0435* (2013.01); *H01M 10/04* (2013.01);
(Continued)

(58) Field of Classification Search
CPC ......... H01M 10/0585; H01M 10/0525; H01M 10/04; H01M 10/0404; H01M 10/0409; H01M 50/105; H01M 4/0435
See application file for complete search history.

(56) References Cited

U.S. PATENT DOCUMENTS 9,706,150 B2    7/2017    Ito et al.
2010/0132308 A1    6/2010    Kadowaki et al.
(Continued)

FOREIGN PATENT DOCUMENTS

| CN | 104054205 A | 9/2014 |
|---|---|---|
| CN | 107170940 A | 9/2017 |

(Continued)

OTHER PUBLICATIONS

Extended European Search Report for European Application No. 20804921.3, dated May 24, 2022.
(Continued)

*Primary Examiner* — Matthew W Van Oudenaren
(74) *Attorney, Agent, or Firm* — Birch, Stewart, Kolasch & Birch, LLP (57) ABSTRACT

Discussed is a method for manufacturing an electrode assembly, the method including a first combination process of combining a plurality of first electrodes with a first separator at regular intervals to form a first combination; and a second combination process of combining a plurality of second electrodes with the first combination to form a second combination, wherein each of the plurality of second electrodes respectively faces each of the plurality to first electrodes with the first separator therebetween.

15 Claims, 4 Drawing Sheets

(51) Int. Cl.
*H01M 10/04* (2006.01)
*H01M 10/0525* (2010.01)
*H01M 50/105* (2021.01)

(52) U.S. Cl.
CPC .... *H01M 10/0404* (2013.01); *H01M 10/0409* (2013.01); *H01M 10/0525* (2013.01); *H01M 50/105* (2021.01)

(56) References Cited

U.S. PATENT DOCUMENTS

| | | |
|---|---|---|
| 2014/0020235 A1 | 1/2014 | Aramaki et al. |
| 2014/0026398 A1 | 1/2014 | Watanabe et al. |
| 2014/0059875 A1 | 3/2014 | Yuhara et al. |
| 2014/0182118 A1 | 7/2014 | Kim et al. |
| 2014/0186671 A1 | 7/2014 | Kim et al. |
| 2014/0212729 A1 | 7/2014 | Park et al. |
| 2014/0272507 A1 | 9/2014 | Ku et al. |
| 2014/0377631 A1 | 12/2014 | Park et al. |
| 2017/0069927 A1 | 3/2017 | Jeong et al. |
| 2017/0259552 A1 | 9/2017 | Kang |
| 2017/0309930 A1 | 10/2017 | Kim et al. |
| 2018/0131031 A1 | 5/2018 | Ku et al. |
| 2019/0237788 A1 | 8/2019 | Bettey et al. |
| 2019/0386325 A1 | 12/2019 | Jeong et al. |
| 2020/0067051 A1 | 2/2020 | Yamashita et al. |
| 2020/0127262 A1 | 4/2020 | Park et al. |

FOREIGN PATENT DOCUMENTS

| | | |
|---|---|---|
| CN | 108199092 A | 6/2018 |
| CN | 110352521 A | 10/2019 |
| JP | 2004-14417 A | 1/2004 |
| JP | 2011-165336 A | 8/2011 |
| JP | 2011-219205 A | 11/2011 |
| JP | 5893461 B2 | 3/2016 |
| JP | 2016-136506 A | 7/2016 |
| JP | 5953083 B2 | 7/2016 |
| JP | 2017-162789 A | 9/2017 |
| KR | 10-2010-0061317 A | 6/2010 |
| KR | 10-2013-0131246 A | 12/2013 |
| KR | 10-2014-0015647 A | 2/2014 |
| KR | 10-1507015 B1 | 3/2015 |
| KR | 10-2016-0143587 A | 12/2016 |
| KR | 10-1703618 B1 | 2/2017 |
| KR | 10-1738633 B1 | 5/2017 |
| KR | 10-2017-0121671 A | 11/2017 |
| KR | 10-2018-0057847 A | 5/2018 |
| WO | WO 2008/139561 A1 | 11/2008 |
| WO | WO 2018/002598 A1 | 1/2018 |
| WO | WO 2018/154776 A | 8/2018 |

OTHER PUBLICATIONS

International Search Report (PCT/ISA/210) issued in PCT/KR2020/006307 mailed on Aug. 28, 2020.

METHOD FOR MANUFACTURING ELECTRODE ASSEMBLY, ELECTRODE ASSEMBLY MANUFACTURED THERETHROUGH, AND SECONDARY BATTERY

CROSS-REFERENCE TO RELATED APPLICATION

The present application claims the benefit of the priority of Korean Patent Application Nos. 10-2019-0055813, filed on May 13, 2019, and 10-2020-0056979, filed on May 13, 2020, which are hereby incorporated by reference in their entirety.

TECHNICAL FIELD

The present invention relates to a method for manufacturing an electrode assembly, an electrode manufactured therethrough, and a secondary battery.

BACKGROUND ART

Secondary batteries are rechargeable unlike primarily batteries, and also, the possibility of compact size and high capacity is high. Thus, recently, many studies on secondary batteries are being carried out. As technology development and demands for mobile devices increase, the demands for secondary batteries as energy sources are rapidly increasing.

Rechargeable batteries are classified into coin type batteries, cylindrical type batteries, prismatic type batteries, and pouch type batteries according to a shape of a battery case. In such a secondary battery, an electrode assembly mounted in a battery case is a chargeable and dischargeable power generating device having a structure in which an electrode and a separator are stacked.

The electrode assembly may be approximately classified into a jelly-roll type electrode assembly in which a separator is interposed between a positive electrode and a negative electrode, each of which is provided as the form of a sheet coated with an active material, and then, the positive electrode, the separator, and the negative electrode are wound, a stacked type electrode assembly in which a plurality of positive and negative electrodes with a separator therebetween are sequentially stacked, and a stack/folding type electrode assembly in which stacked type unit cells are wound together with a separation film having a long length.

In the case of the stacked type electrode assembly, a unit cell constituted by an assembly of a plurality of electrodes and a plurality of separators is provided in plurality, and the plurality of unit cells are stacked to manufacture the stacked type electrode assembly. Also, the unit cell, for example, a first electrode, a first separator, a second electrode, and a second separator are combined at once so as to be bonded to each other. Here, the second electrode disposed between the first separator and the second separator is invisible because the second electrode is covered by the first separator and the second separator. Thus, it is difficult to stack the first electrode so as to correspond to the second electrode, and thus, there has been a problem in that electrode meandering occurs. That is, there has been a problem that a positive electrode is stacked out of a range of a negative electrode to cause an overhang defect, and thus, battery capacity is reduced, and lithium ions are precipitated.

Also, in order to combine the plurality of electrodes and the plurality of separators at once, the electrode having the form of a sheet moves after being cut at a certain interval. Thus, since a moving distance of the electrode is long, meandering may occur due to releasing of tension. Also, since an electrode tab travels to be rolled, the electrode tab may be folded, and precision of a cutting position may be deteriorated.

[Prior Art Document] (Patent Document) Korean Patent Publication No. 10-2014-0015647

DISCLOSURE OF THE INVENTION

Technical Problem

One aspect of the present invention is to provide a method for manufacturing an electrode assembly, in which a position between electrodes is easily corrected when a plurality of electrodes and a plurality of separators are stacked, a traveling distance of each of the electrodes is reduced, and electrode meandering is reduced and prevented, an electrode assembly manufactured therethrough, and a secondary battery.

Technical Solution

A method for manufacturing an electrode assembly, in which an electrode and a separator are alternately stacked to manufacture the electrode assembly, wherein the electrode comprises a plurality of first electrodes and a plurality of second electrodes, and the separator comprises a first separator, according to an embodiment of the present invention comprises a first combination process of combining the plurality of first electrodes with the first separator at regular intervals to form a first combination and a second combination process of combining the plurality of second electrodes with the first combination so that each of the second electrode faces each of the first electrode with the first separator therebetween, thereby forming a second combination.

Advantageous Effects

According to the present invention, when the plurality of electrodes and the plurality of separators are stacked, one electrode may be combined with one separator, and then the other electrode and the other separator may be combined with each other with respect to the one electrode to increase in manufacturing rate, reduce the traveling distance of the electrode, and preventing the electrode meandering.

Here, the first electrode may be combined with the first separator to form the first combination, and then, the position of the first electrode may be detected through the sensor to combine the second electrode with the second separator with respect to the position of the first electrode to easily correct the positions of the first electrode and the second electrode and significantly reduce or prevent the electrode meandering.

MODE FOR CARRYING OUT THE INVENTION

The objectives, specific advantages, and novel features of the present invention will become more apparent from the following detailed description taken in conjunction with the accompanying drawings. It should be noted that the reference numerals are added to the components of the drawings in the present specification with the same numerals as possible, even if they are illustrated in other drawings. Also, the present invention may be embodied in different forms and should not be construed as limited to the embodiments set forth herein. In the following description of the present invention, the detailed descriptions of related arts which may unnecessarily obscure the gist of the present invention will be omitted.

[Method for Manufacturing Electrode Assembly According to an Embodiment]

Figure 1:
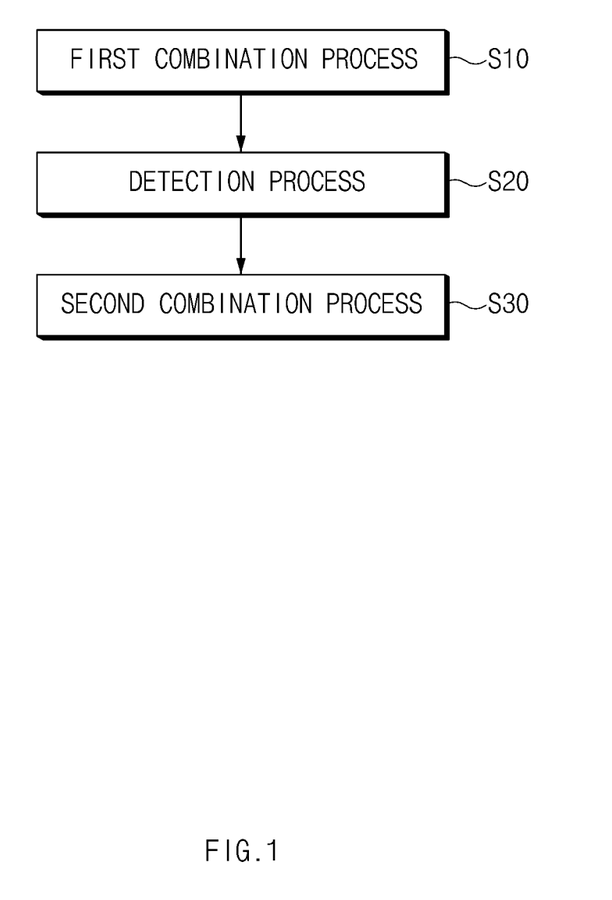
FIG. 1 is a flowchart illustrating a method for manufacturing an electrode assembly according to an embodiment of the present invention.
Figure 2:
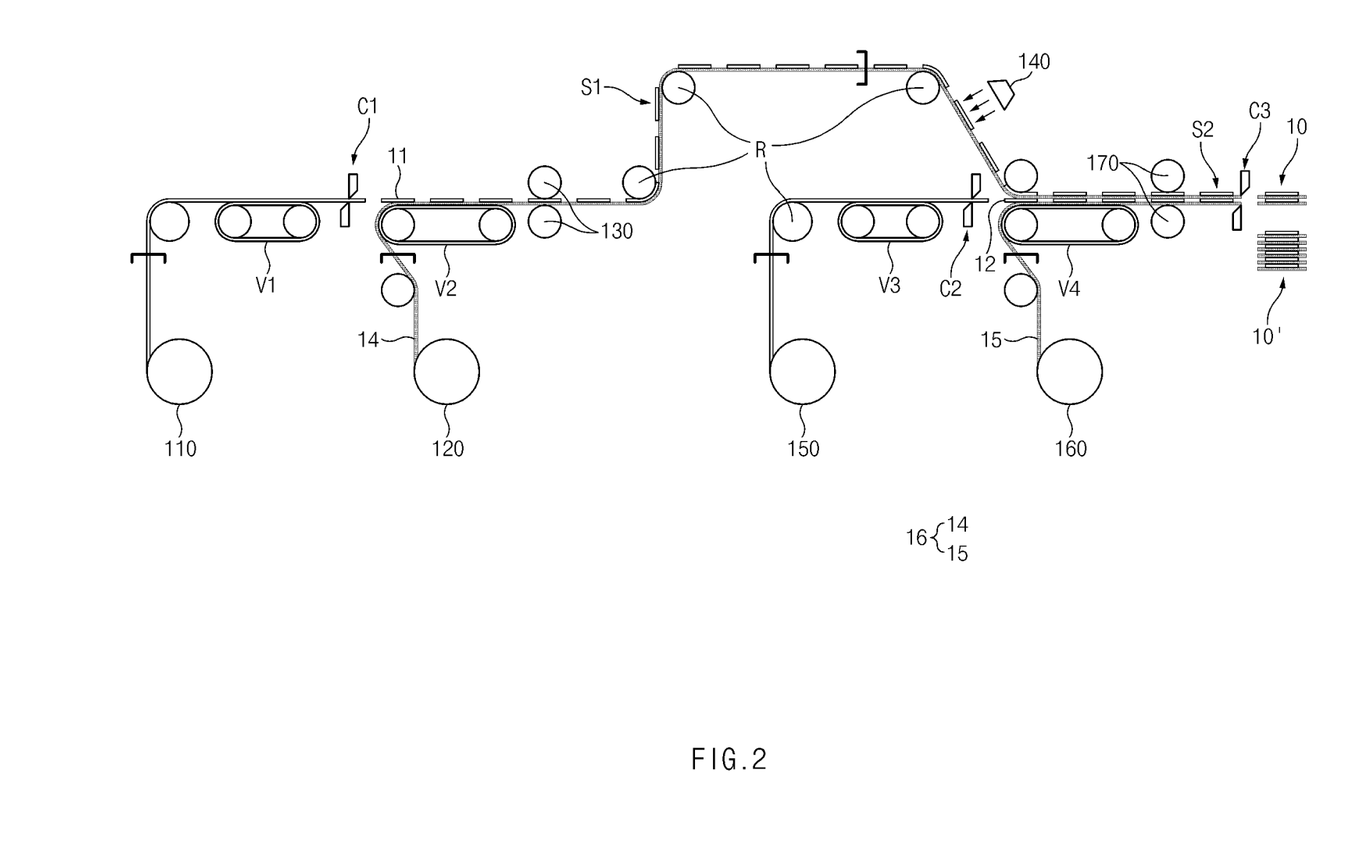
FIG. 2 is a schematic front view illustrating the method for manufacturing the electrode assembly according to an embodiment of the present invention.

FIG. 1 is a flowchart illustrating a method for manufacturing an electrode assembly according to an embodiment of the present invention, and FIG. 2 is a schematic front view illustrating the method for manufacturing the electrode assembly according to an embodiment of the present invention.

Referring to FIGS. 1 and 2, a method for manufacturing an electrode assembly according to an embodiment of the present invention comprises a first combination process (S10) of combining a first electrode 11 with a first separator 14 at regular intervals to form a first combination S1, a detection process (S20) of detecting a position of the first electrode 11 in the first combination S1 through a position detection sensor 140, and a second combination process (S30) of combining a plurality of second electrodes 12 with the first combination S1 so that the second electrodes 12 face the first electrode 11 with the first separator 14 therebetween to form a second combination S2. Also, the method for manufacturing the electrode assembly according to an embodiment of the present invention may further comprise a unit cell formation process of cutting the second combination S2 at regular intervals to form a plurality of unit cells 10 and an electrode assembly formation process of stacking the unit cells 10 to form an electrode assembly 10'. Also, the method for manufacturing the electrode assembly according to an embodiment of the present invention may further comprise a first electrode supply process of cutting the first electrode 11 at regular intervals to supply the cut first electrodes 11 to the first combination process (S10) and a second electrode supply process of cutting the second electrode 12 at regular intervals to supply the cut second electrodes 12 to the second combination process (S30).

Hereinafter, the method for manufacturing the electrode assembly according to an embodiment of the present invention will be described in more detail with reference to FIGS. 1 to 3.

Referring to FIGS. 1 and 2, the method for manufacturing the electrode assembly according to an embodiment of the prevent invention may be an electrode assembly manufacturing method in which an electrode 13 and a separator 16 are alternately stacked to manufacture the electrode assembly 10'.

The electrode assembly 10' may be a chargeable and dischargeable power generation element and have a shape in which the electrode 13 and the separator 16 are alternately stacked to be assembled with each other.

The electrode 13 may comprise a plurality of first electrode 11 and a plurality of second electrodes 12, and the separator 16 may comprise a first separator 14 and a second separator 15.

Here, for example, the first electrode 11 may be provided as a positive electrode, and the second electrode 12 may be provided as a negative electrode.

Here, for another example, the first electrode may be provided as a negative electrode, and the second electrode 12 may be provided as a positive electrode.

The positive electrode may comprise a positive electrode collector and a positive electrode active material applied to the positive electrode collector. For example, the positive electrode collector may be provided as foil made of an aluminum material, and the positive electrode active material may be made of lithium manganese oxide, lithium cobalt oxide, lithium nickel oxide, lithium iron phosphate, or a compound or mixture thereof containing at least one or more of the above-described materials.

The negative electrode may comprise a negative electrode collector and a negative electrode active material applied to the negative electrode collector. For example, the negative electrode collector may be provided as foil made of a copper (Cu) or nickel (Ni) material. The negative electrode active material may comprise synthetic graphite, a lithium metal, a lithium alloy, carbon, petroleum coke, activated carbon, graphite, a silicon compound, a tin compound, a titanium compound, or an alloy thereof. Here, the negative electrode active material may further comprise, for example, non-graphite-based SiO (silica) or SiC (silicon carbide).

Also, the separator 16 may be made of an insulating material and a flexible material. Here, the separator 16 may be made of, for example, a polyolefin-based resin film such as polyethylene or polypropylene having micropores.

In the first electrode supply process, the first electrode 11 wound around a first electrode winding roll 110 in the form of a sheet may be cut at regular intervals and supplied to the first combination process (S10).

Here, in the first electrode supply process, the first electrode 11 having the form of the sheet, which is wound around the first electrode winding roll 110, may be unwound to move to a first cutting part C1 through a first conveyor belt V1. Then, the first electrode 11 may be cut at regular intervals in the first cutting part C1 and be supplied to the first combination process (S10).

In the first combination process (S10), the plurality of first electrodes 11 may be combined with the first separator 14 at regular intervals to form the first combination S1. Here, in the first combination process (S10), the plurality of first electrodes 11 may be stacked on a top surface of the first separator 14 and then combined with the first separator 14.

Also, in the first combination process S10, the first electrode 11 and the first separator 14 may be bonded to each other through lamination, in which heat and a pressure are applied, to form the first combination S1.

Here, in the first combination process S10, the first separator 14 wound around a first separator winding roll 120 may be supplied, the plurality of first electrodes 11 may be stacked at regular intervals on the top surface of the first separator 14, the first separator 14 and the first electrodes 11 stacked on the first separator 14 may pass to be pressed between a pair of first lamirolls 130, thereby forming the first combination S1. Here, when the first electrodes 11 are stacked on the first separator 14, the stack of the first electrodes 11 and the first separator 14 may move to the pair of first lamirolls 130 through a second conveyor belt V2.

As a result, in the first combination process (S10), since the first electrode 11 and the first separator 14 are combined with each other to move to the second combination process (S30), a traveling distance of the first electrode 11 before being cut may be minimized to prevent the tension from being released during the traveling of the electrodes and improve accuracy in electrode position, thereby significantly reducing the electrode meandering. Also, the traveling distance of the first electrode 11 before being cut may be minimized to significantly reduce damage of an electrode tab disposed at an end of the first electrode 11 by a roller by which the first electrode 11 moves.

In the detection process (S20), before preforming the second combination process (S30), a position of the first electrode 11 in the first combination S1 may be detected through the position sensing sensor 140.

Furthermore, in the detection process (S20), a vision camera sensor may be applied as the position detection sensor 140 to detect the position of the first electrode 11.

In the detection process S20, before the second combination process (S30) is performed, a position of the second electrode 12 may be further detected through a sensor.

In the second electrode supply process, the second electrode 12 wound around a second electrode winding roll 150 in the form of a sheet may be cut at regular intervals and supplied to the second combination process (S30).

Here, in the second electrode supply process, the second electrode 12 having the form of the sheet, which is wound around the second electrode winding roll 150, may be unwound to move to a second cutting part C2 through a third conveyor belt V3. Then, the second electrode 12 may be cut at regular intervals in the second cutting part C2 and be supplied to the second combination process (S30).

In the second combination process (S30), the plurality of second electrodes 12 may be combined with the first combination S1 to face the first electrode 11 with the first separator 14 therebetween, thereby forming the second combination S2.

Also, in the second combination process (S30), the second electrode 12 may be combined so that the position of the second electrode 12 corresponds to the position of the first electrode 11, which is detected through the detection process (S20). Here, in the second combination process (S30), the position value of the first electrode 11, which is detected by the position detection sensor 140 may be compared to a reference value, which is stored in a memory, through a controller, and the first combination S1 may be stacked on the top surface of the second electrode 12 so that the position of the second electrode 12 corresponds to the position of the first electrode 11.

Furthermore, in the second combination process (S30), the second separator 15 may be further combined with the first combination S1 with the second electrode 12 therebetween.

Also, in the second combination process (S30), the second electrode 12 and the second separator 15 may be mutually bonded to the first combination S1 through the lamination in which the heat and the pressure are applied.

Here, in the second combination process (S30), the winding of the second separator 15 wound around a second separator winding roll 160 may be released to be supplied, and the plurality of second electrodes 12 may be stacked at regular intervals on the top surface of the supplied second separator 15. Then, after the first combination S1 is stacked on the top surface of the second electrode 12, the second separator 15, the second electrode 12, and the first combination S1 may pass to be pressed between a pair of second lamirolls 170, thereby forming the second combination S2.

Here, when the second separator 15, the second electrode 12, and the first combination S1 are stacked, the stack of the second separator 15, the second electrodes 12, and the first combination S1 may move to the pair of second lamirolls 170 through a fourth conveyor belt V4.

In the second combination process (S30), for example, the first electrode 11, the first separator 14, the second electrode 12, and the second separator 15 may be stacked downward from an upper side so as to be bonded to each other. That is, the first combination S1, the second electrode 12, and the second separator 15 may be combined with each other. As a result, the rest of the second electrode 12 and the second separator 15 may be combined with each other with respect to the first electrode 11 of the first combination S1, which is exposed at the uppermost portion, to improve input accuracy of the remaining materials.

Also, in the second combination process (S30), for another example, when the first combination S1, the second electrode 12, and the second separator 15 are combined with each other, an additional first electrode may be combined with a lower portion of the second separator 15 to face the second electrode 12. Here, for example, the stacking of the additional first electrode, which faces a portion between the second separators 14, may be combined with the lower portion of the second electrode 12 with respect to the first electrode 11 of the first combination S1. Here, the first electrode 11 disposed at an upper side and the first electrode disposed at a lower side with respect to the second electrode 12 may be of the same polarity.

In the unit cell formation process, the second combination S2 may be cut at regular intervals in a manner, in which the first separator 14 and the second separator 15, which are disposed between the plurality of first electrodes 11, are cut together, to form a plurality of unit cells 10.

Here, in the unit cell formation process, the second combination S2 combined while passing through the second combination process (S30) may be cut at regular intervals through a third cutting part C3.

In the electrode assembly formation process, the plurality of unit cells 10 may be stacked to form an electrode assembly 10'.

Here, the plurality of unit cells 10 may be sequentially stacked and mutually bonded to each other by applying heat and a pressure.

In each of the processes in the method for manufacturing the electrode assembly according to an embodiment of the present invention, the movement of the electrode 13 and the separator 16 may be guided or travel through a plurality of traveling rollers R.

Referring to FIGS. 1 and 2, in the method for manufacturing the electrode assembly according to an embodiment of the present invention, which has the above-described configuration, when the plurality of electrodes 13 and the plurality of separators 16 are stacked, after one electrode is combined with one separator in the first combination process (S10), the other electrode and the other separator may be combined with each other with respect to the one electrode in the second combination process (S30) to increase in manufacturing rate, decrease in traveling distance of the electrode, and prevent the electrode from being meandered. Also, as the traveling distance of the electrode decreases, the tension of the electrode 13 may be easily maintained, and the number of devices for correcting the traveling position of the electrode 13 may be reduced.

Here, in the method for manufacturing the electrode assembly according to an embodiment of the present invention, after the first electrode 11 is combined with the first separator 14 to form the first combination S1, the position of the first electrode 11 may be detected through the position detection sensor 140 to combine the second electrode 12 with the second separator 15 with respect to the position of the first electrode 11, thereby easily correcting the positions of the first electrode 11 and the second electrode 12 and significantly reducing or preventing the meandering of the electrode.

[Method for Manufacturing Electrode Assembly According to Another Embodiment]

Hereinafter, a method for manufacturing an electrode assembly according to another embodiment of the present invention will be described.

Figure 3:
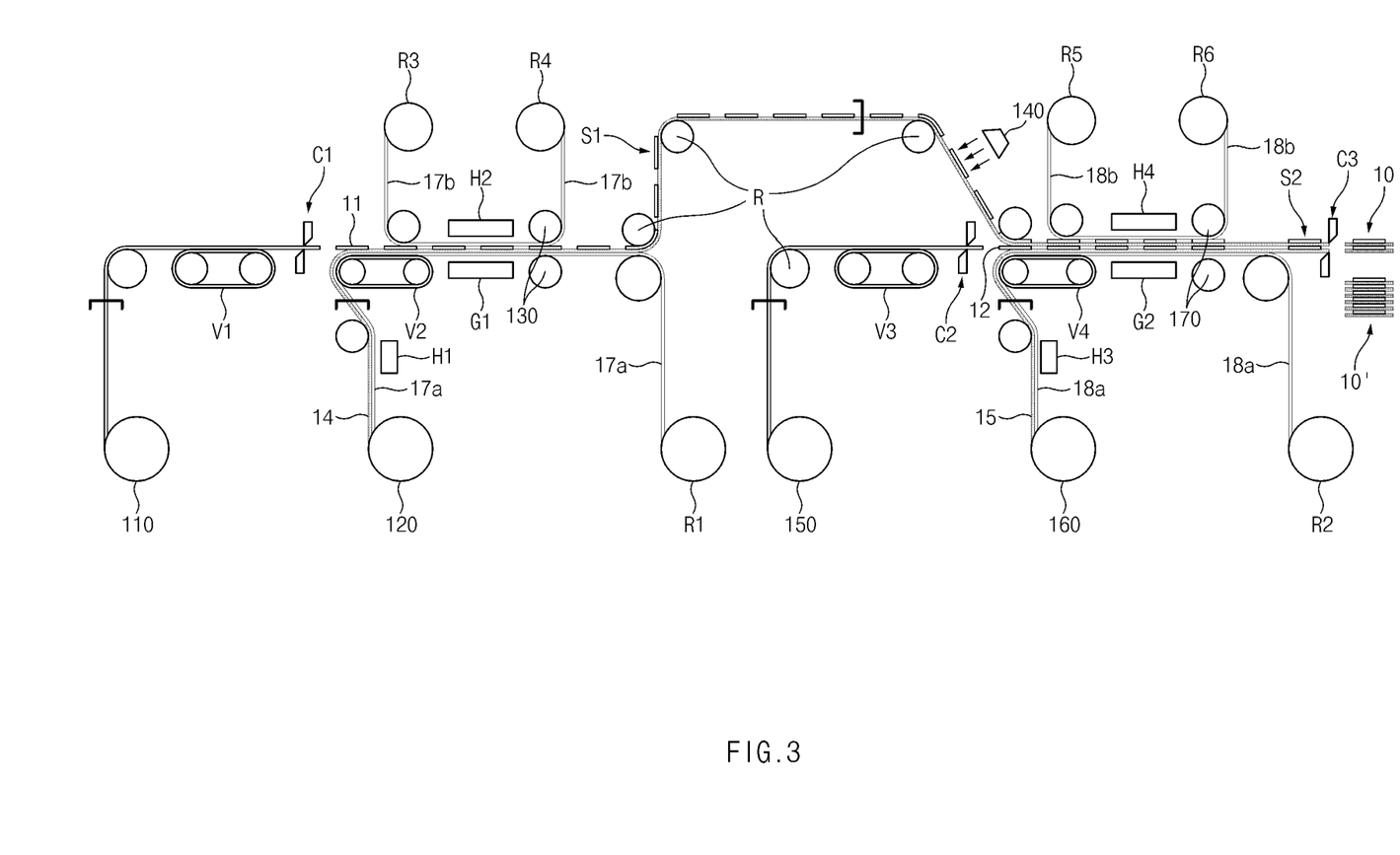
FIG. 3 is a schematic front view illustrating a method for manufacturing an electrode assembly according to another embodiment of the present invention.

FIG. 3 is a schematic front view illustrating a method for manufacturing an electrode assembly according to another embodiment of the present invention.

Referring to FIG. 3, a method for manufacturing an electrode assembly according to another embodiment of the present invention comprises a first lower protective film combination process of combining a first lower protective film 17a with a lower portion of a first separator 14, a first combination process of combining a first electrode 11 with a first separator 14 at regular intervals to form a first combination S1, a detection process of detecting a position of the first electrode 11 in the first combination S1 through a position detection sensor 140, and a second combination process of combining a plurality of second electrodes 12 with the first combination S1 so that the second electrodes 12 face the first electrode 11 with the first separator 14 therebetween to form a second combination S2.

Also, the method for manufacturing the electrode assembly according to another embodiment of the present invention may further comprise a second lower protective film combination process of a second lower protective film 18a with a lower portion of a second separator 15, a unit cell formation process of cutting the second combination S2 at regular intervals to form a plurality of unit cells 10, and an electrode assembly formation process of stacking the unit cells 10 to form an electrode assembly 10'.

The method for manufacturing the electrode assembly according to another embodiment of the present invention is different from the method for manufacturing the electrode assembly according to an embodiment of the present invention in that the method further comprises the first and second lower protective film combination processes and first and second lower protective film separation processes. Thus, in descriptions of the method for manufacturing the electrode assembly according to another embodiment of the present invention, contents duplicated with the method for manufacturing the electrode assembly according to forgoing embodiment of the present invention will be omitted or briefly described, and also, differences therebetween will be mainly described.

In more detail, in the method for manufacturing the electrode assembly according to another embodiment of the present invention, the first lower protective film combination process may be a process of combining the first lower protective film 17a with the lower portion of the first separator 14 before the first combination process. Here, the first lower protective film 17a may be made of, for example, a PET material.

Thus, the first lower protective film 17a may be combined with the lower portion of the first separator 14 to significantly reduce an occurrence of wrinkles and location defects in the first separator 14 when traveling.

Here, in the first lower protective film combination process, the first lower protective film 17a may be wound around a first separator winding roll 120 after the first lower protective film 17a is combined with the lower portion of the first separator 14.

In the first combination process, a plurality of first electrodes 11 may be combined with the first separator 14 at regular intervals to form a first combination S1. Here, in the first combination process, the plurality of first electrodes 11 may be stacked on a top surface of the first separator 14 and then combined with the first separator 14.

Also, in the first combination process, the first electrode 11 and the first separator 14 may be bonded to each other through lamination, in which heat and a pressure are applied, to form the first combination S1.

Here, in the first combination process, the first separator 14 wound around the first separator winding roll 120 may be supplied, the plurality of first electrodes 11 may be stacked at regular intervals on the top surface of the first separator 14, the first separator 14 and the first electrodes 11 stacked on the first separator 14 may pass to be pressed between a pair of first lamirolls 130, thereby forming the first combination S1. Here, when the first electrodes 11 are stacked on the first separator 14, the stack of the first electrodes 11 and the first separator 14 may move to the pair of first lamirolls 130 through a second conveyor belt V2.

In the method for manufacturing the electrode assembly according to another embodiment of the present invention, the first combination process may comprise a first heating step of heating the first electrode 11 and the first separator 14 through first heater parts H1 and H2 before the first electrode 11 and the first separator 14 pass between the pair of first lamirolls 130. Also, the first heater parts H1 and H2 may comprise a first preheating heater H1 and a first main heater H2.

Here, the first preheating heater H1 may be disposed at a side, at which the first separator 14 is unwound from the first separator winding roll 120 so as to be supplied, to firstly heat the first separator 14 and the first lower protective film 17a, and the first main heater H2 may be disposed above the first electrode 11 stacked on the first separator 14 to secondarily heat the stack of the first separator 14 and the first electrode 11 from an upper side. Thus, the first separator 14 that is supplied while being unwound from the first separator winding roll 120 may be preheated through the first preheating heater H1 before the stack of the first separator 14 and the first electrode 11 is put into a heating section, in which the first main heater H2 is disposed, thereby improving adhesion strength between the first separator 14 and the first electrode 11.

Also, a lower guide G1 may be disposed to be spaced a predetermined distance from a side facing the first main heater H2 to support lower portions of the first separator 14 and the first lower protective film 17a.

Furthermore, each of the first preheating heater H1 and the first main heater H2 may be provided as an infrared (IR) heater. Thus, the first electrode 11 and the first separator 14 may be heated using the IR heater to prevent an electrode tab from being twisted by being caught by the heater part in the existing heating section. That is, although the existing upper and lower heaters are installed at an interval of 2 mm to cause the catching of the electrode tab at inlets of the upper and lower heaters, the IR heater according to the present invention may heat the first electrode 11 and the first separator 14 at a farther distance by using the first preheating heater H1 and the first main heater H2 to prevent the electrode tab from being twisted by being caught by the heater parts H1 and H2. Here, for example, each of the first preheating heater H1 and the first main heater H2 may be disposed at a position spaced a distance of 20 mm from an object to be heated.

In the first lower protective film separation process, after the first combination process, the first lower protective film 17a may be separated from the first separator 14 before the second combination process. Here, in the first lower protective film process, the first lower protective film 17a may be wound around the first lower protective film winding roll R1 after the first lower protective film 17a is separated from the lower portion of the first separator 14.

The method for manufacturing the electrode assembly according to another embodiment of the present invention may further comprise a first upper protective film combination process of combining a first upper protective film 17b with an upper portion of the first electrode 11 before the first combination process and a first upper protective film separation process of separating the first upper protective film 17b from the first electrode 11 after the first combination process.

Here, in the first upper protective film combination process, the first upper protective film 17b may be supplied while being unwound from a first upper protective film supply roll R3, around which the first upper protective film 17b is wound. Here, in the first upper protective film separation process, the first upper protective film 17b may be separated from the first electrode 11 and then wound around a first upper protective film winding roll R4.

In the second lower protective film combination process, the second lower protective film 18a may be combined with the lower portion of the second separator 15 before the second combination process. Here, the second lower protective film 18a may be made of, for example, a PET material.

Thus, the second lower protective film 18a may be combined with the lower portion of the second separator 15 to significantly reduce an occurrence of wrinkles and location defects in the second separator 15 when traveling.

Here, in the second lower protective film combination process, the second lower protective film 18a may be wound around a second separator winding roll 160 after the second lower protective film 18a is combined with the lower portion of the second separator 15.

In the detection process, before preforming the second combination process, a position of the first electrode 11 in the first combination S1 may be detected through the position sensing sensor 140.

Furthermore, in the detection process, a vision camera sensor may be applied as the position detection sensor 140 to detect the position of the first electrode 11.

In the detection process, a position of the second electrode 12 may be further detected through a sensor before performing the second combination process.

In the second combination process, the plurality of second electrodes 12 may be combined with the first combination S1 to face the first electrode 11 with the first separator 14 therebetween, thereby forming the second combination S2.

Also, in the second combination process, the second electrode 12 may be combined so that the position of the second electrode 12 corresponds to the position of the first electrode 11, which is detected through the detection process. Here, in the second combination process, the position value of the first electrode 11, which is detected by the position detection sensor 140 may be compared to a reference value, which is stored in a memory, through a controller, and the first combination S1 may be stacked on the top surface of the second electrode 12 so that the position of the second electrode 12 corresponds to the position of the first electrode 11.

Furthermore, in the second combination process, the second separator 15 may be further combined with the first combination S1 with the second electrode 12 therebetween.

Also, in the second combination process, the second electrode 12 and the second separator 15 may be mutually bonded to the first combination S1 through the lamination in which the heat and the pressure are applied.

Here, in the second combination process, the winding of the second separator 15 wound around a second separator winding roll 160 may be released to be supplied, and the plurality of second electrodes 12 may be stacked at regular intervals on the top surface of the supplied second separator 15. Then, after the first combination S1 is stacked on the top surface of the second electrode 12, the second separator 15, the second electrode 12, and the first combination S1 may pass to be pressed between a pair of second lamirolls 170, thereby forming the second combination S2.

Here, when the second separator 15, the second electrode 12, and the first combination S1 are stacked, the stack of the second separator 15, the second electrodes 12, and the first combination S1 may move to the pair of second lamirolls 170 through a fourth conveyor belt V4.

In the second lower protective film separation process, the second lower protective film 18a may be separated from the second separator 15 after the second combination process. Here, in the second lower protective film separation process, the second lower protective film 18a may be wound around the second lower protective film winding roll R2 after the second lower protective film 18a is separated from the lower portion of the second separator 15.

The method for manufacturing the electrode assembly according to another embodiment of the present invention may further comprise a second upper protective film combination process of combining a second upper protective film 18b with an upper portion of the first electrode 11 before the second combination process and a second upper protective film separation process of separating the second upper protective film 18b from the first electrode 11 after the second combination process.

Here, in the second upper protective film combination process, the second upper protective film 18b may be supplied while being unwound from a second upper protective film supply roll R5, around which the second upper protective film 18b is wound. Here, in the second upper protective film separation process, the second upper protective film 18b may be separated from the first electrode 11 and then wound around a second upper protective film winding roll R6.

In the method for manufacturing the electrode assembly according to another embodiment of the present invention, the second combination process may comprise a second heating step of heating the first combination S1, the second electrode 12, and the second separator 15 through second heater parts H3 and H4 before the first combination S1, the second electrode 12, and the second separator 15 pass between a pair of second lamirolls 170. Also, the second heater parts H3 and H24 may comprise a second preheating heater H3 and a second main heater H4.

Here, the second preheating heater H3 may be disposed at a side, at which the second separator 15 is unwound from the second separator winding roll 160 so as to be supplied, to firstly heat the second separator 15 and the second lower protective film 18a, and the second main heater H4 may be disposed above the first combination S1 stacked on the second separator 15 to secondarily heat the stack of the first combination S1, the second electrode 12, and the second separator 15 from an upper side. Thus, the second separator that is supplied while being unwound from the second separator winding roll 160 may be preheated through the second preheating heater H3 before the stack of the first combination S1, the second electrode 12, and the second separator 15 is put into a heating section, in which the second main heater H4 is disposed, thereby improving adhesion strength between the second separator 15 and the second electrode 12.

Also, a lower guide G2 may be disposed to be spaced a predetermined distance from a side facing the second main heater H4 to support lower portions of the second separator 15 and the second lower protective film 18a.

Furthermore, each of the second preheating heater H3 and the second main heater H4 may be provided as an infrared (IR) heater. Thus, the first combination S1, the second electrode 12, and the second separator 15 may be heated using the IR heater to prevent an electrode tab from being twisted by being caught by the heater part in the existing heating section. That is, although the existing upper and lower heaters are installed at an interval of 2 mm to cause the catching of the electrode tab at inlets of the upper and lower heaters, the IR heater according to the present invention may heat the first combination S1, the second electrode 12, and the second separator 15 at a farther distance by using the second preheating heater H3 and the second main heater H4 to prevent the electrode tab from being twisted by being caught by the heater H3 and H4.

In the unit cell formation process, the second combination S2 may be cut at regular intervals in a manner, in which the first separator 14 and the second separator 15, which are disposed between the plurality of first electrodes 11, are cut together, to form a plurality of unit cells 10.

Here, in the unit cell formation process, the second combination S2 combined while passing through the second combination process may be cut at regular intervals through a third cutting part C3.

In the electrode assembly formation process, the plurality of unit cells 10 may be stacked to form an electrode assembly 10'.

Here, the plurality of unit cells 10 may be sequentially stacked and mutually bonded to each other by applying heat and a pressure.

In each of the processes in the method for manufacturing the electrode assembly according to an embodiment of the present invention, the movement of the electrode 13 and the separator 16 may be guided or travel through a plurality of traveling rollers R.

Referring to FIGS. 1 and 2, in the method for manufacturing the electrode assembly according to an embodiment of the present invention, which has the above-described configuration, when the plurality of electrodes 13 and the plurality of separators 16 are stacked, after one electrode is combined with one separator in the first combination process, the other electrode and the other separator may be combined with each other with respect to the one electrode in the second combination process to increase in manufacturing rate, decrease in traveling distance of the electrode, and prevent the electrode from being meandered. Also, as the traveling distance of the electrode decreases, the tension of the electrode 13 may be easily maintained, and the number of devices for correcting the traveling position of the electrode 13 may be reduced.

Here, in the method for manufacturing the electrode assembly according to an embodiment of the present invention, after the first electrode 11 is combined with the first separator 14 to form the first combination S1, the position of the first electrode 11 may be detected through the position detection sensor 140 to combine the second electrode 12 with the second separator 15 with respect to the position of the first electrode 11, thereby easily correcting the positions of the first electrode 11 and the second electrode 12 and significantly reducing or preventing the meandering of the electrode.

Electrode Assembly

Hereinafter, an electrode assembly according to an embodiment of the present invention will be described.

Figure 4:
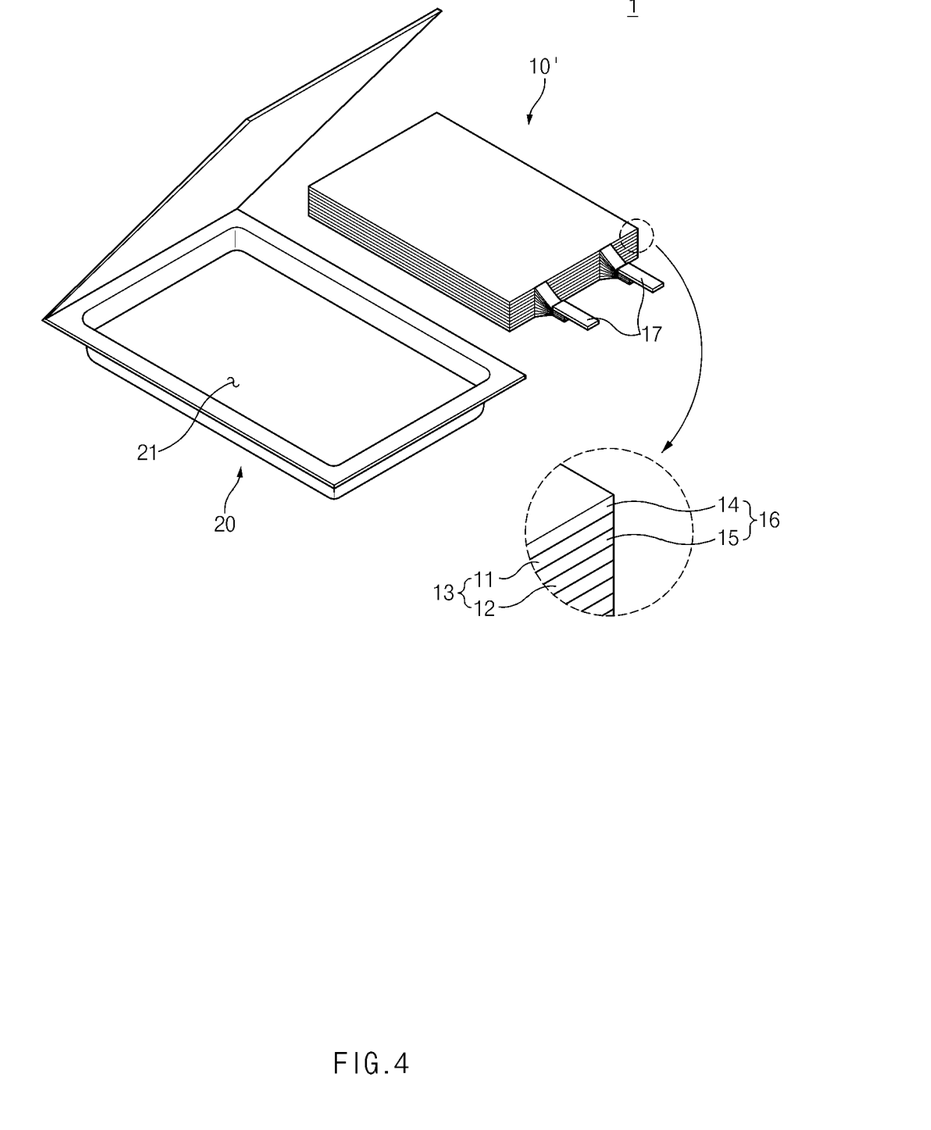
FIG. 4 is a perspective view exemplarily illustrating an electrode assembly manufactured through the method for manufacturing the electrode assembly and a secondary battery comprising the electrode assembly according to an embodiment of the present invention.

FIG. 4 is a perspective view exemplarily illustrating an electrode assembly manufactured through the method for manufacturing the electrode assembly and a secondary battery comprising the electrode assembly according to an embodiment of the present invention.

Referring to FIGS. 2 and 4, an electrode assembly 10' according to an embodiment of the present invention may manufactured through the methods for manufacturing the electrode assembly according to the foregoing embodiment and another embodiment of the present invention.

Thus, in this embodiment, contents duplicated with those of the method for manufacturing the electrode assembly according to the foregoing embodiment and the method for manufacturing the electrode assembly according to another embodiment will be omitted.

The electrode assembly 10' may be a chargeable and dischargeable power generation element and have a structure in which an electrode 13 and a separator 16 are stacked to be combined with each other. Here, the electrode assembly 10' may have, for example, a shape in which a first electrode 11, a first separator 14, a second electrode 12, and a second separator 15 are alternately stacked to be combined with each other. Here, the electrode assembly 10' may be formed by stacking, for example, a plurality of unit cells 10. That is, the electrode assembly 10' may be formed by stacking the plurality of unit cells 10 in which the first electrode 11, the first separator 14, the second electrode 12, and the second separator 15 are combined with each other.

Secondary Battery

Hereinafter, a secondary battery according to an embodiment of the present invention will be described.

Referring to FIGS. 2 and 4, a secondary battery according to an embodiment of the present invention comprises an electrode assembly 10' and a battery case 20 accommodating the electrode assembly 10'.

The secondary battery according to an embodiment of the present invention may be a secondary battery 1 comprising the electrode assembly 10' manufactured through each of the methods for the electrode assembly according to the foregoing embodiment and another embodiment. Thus, contents of this embodiment, which are duplicated with those according to the forgoing embodiment, will be omitted or briefly described, and also, differences therebetween will be mainly described.

In more detail, the electrode assembly 10' may be the electrode assembly 10' manufactured through the method for manufacturing the electrode assembly according to the foregoing embodiment. In the electrode assembly 10', an electrode 13 and a separator 16 may be alternately stacked. Here, the electrode assembly 10' may be formed by stacking, for example, a plurality of unit cells 10. Here, the electrode assembly 10' may have a shape in which a first electrode 11, a first separator 14, a second electrode 12, and a second separator 15 are alternately stacked to be combined with each other through lamination.

The electrode assembly 10' may further comprise, for example, an electrode lead 17 that connects the electrode 13 to an external device.

The battery case 20 may comprise an accommodation part 21 in which the electrode assembly 10' is accommodated.

While the present invention has been particularly shown and described with reference to exemplary embodiments thereof, it is to be understood that the scope of the present invention is not limited to the method for the electrode assembly according to the present invention, the electrode assembly manufactured therethrough, and the secondary battery. It will be understood by those of ordinary skill in the art that various changes in form and details may be made therein without departing from the spirit and scope of the present invention.

Furthermore, the scope of protection of the present invention will be clarified by the appended claims.

The invention claimed is:

1. A method for manufacturing an electrode assembly, the method comprising:
   a first lower protective film combination process of combining a first lower protective film with a lower portion of a first separator;
   a first combination process of combining a plurality of first electrodes with the first separator at regular intervals to form a first combination after performing the first lower protective film combination process;
   a second combination process of combining a plurality of second electrodes with the first combination to form a second combination; and
   a detection process of detecting a position of each of the plurality of first electrodes in the first combination through a position detection sensor before performing the second combination process,
   wherein each of the plurality of second electrodes respectively faces each of the plurality of first electrodes with the first separator therebetween,
   wherein, in the second combination process, the combining is performed so that the position of each of the plurality of first electrodes, which is detected through the detection process, corresponds to a position of each of the plurality of second electrodes, and
   wherein the detection process of detecting the position of each of the plurality of first electrodes in the first combination is performed after the first combination process,
   wherein, in the first lower protective film combination process, the first separator with which the first lower protective film is combined is wound around a first separator winding roll, and
   wherein, in the first combination process, winding of the first separator wound around the first separator winding roll is released to combine the plurality of first electrodes with the first separator.

2. The method of claim 1, further comprising a first lower protective film separation process of separating the first lower protective film from the first separator after the first combination process and before the second combination process.

3. The method of claim 1, wherein, in the detection process, a vision camera sensor is applied as the position detection sensor to detect the position of each of the plurality of first electrodes.

4. The method of claim 1, further comprising a second separator, and in the second combination process, the second separator is further combined with the first combination with the plurality of second electrodes therebetween.

5. The method of claim 4, further comprising, before the second combination process, a second lower protective film combination process of combining a second lower protective film with a lower portion of the second separator.

6. The method of claim 5, wherein, in the second lower protective film combination process, the second separator with which the second lower protective film is combined is wound around a second separator winding roll, and
   in the second combination process, winding of the second separator wound around the second separator winding roll is released to combine the plurality of second electrodes with the second separator.

7. The method of claim 5, further comprising, after the second combination process, a second lower protective film separation process of separating the second lower protective film from the second separator.

8. The method of claim 4, wherein, in the first combination process, the plurality of first electrodes and the first separator are bonded to each other through lamination, in which heat and pressure are applied, to form the first combination, and
   in the second combination process, the plurality of second electrodes and the second separator are bonded to the first combination through lamination in which heat and pressure are applied.

9. The method of claim 8, further comprising:
   a unit cell formation process of simultaneously cutting the first separator and the second separator of the second combination at regular intervals to form a plurality of unit cells; and
   an electrode assembly formation process of stacking the plurality of unit cells to form an electrode assembly.

10. The method of claim 1, further comprising:
    a first electrode supply process of cutting a first electrode sheet, which is wound around a first electrode winding roll, at regular intervals to supply the plurality of first electrodes to the first combination process; and
    a second electrode supply process of cutting a second electrode sheet, which is wound around a second electrode winding roll, at regular intervals to supply the plurality of second electrodes to the second combination process.

11. An electrode assembly manufactured through the method for manufacturing the electrode assembly of claim 1.

12. A secondary battery comprising the electrode assembly manufactured through the method for manufacturing the electrode assembly of claim 1.

13. The method of claim 9, wherein the second combination is cut at a location thereof between adjacent first electrodes.

14. The method of claim 1, wherein the second combination process further includes combining a second separator with the second combination prior to any cutting of the first combination and the second combination.

15. The method of claim 14, further comprising:
    simultaneously cutting the first separator and the second separator of the second combination at regular intervals to form a plurality of unit cells; and
    stacking the plurality of unit cells to form an electrode assembly.

* * * * *